US010193587B2

(12) United States Patent
Li

(10) Patent No.: US 10,193,587 B2
(45) Date of Patent: Jan. 29, 2019

(54) MOBILE PHONE AND COMMUNICATION METHOD THEREOF

(75) Inventor: Jiakuan Li, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 1282 days.

(21) Appl. No.: 14/361,194

(22) PCT Filed: Mar. 14, 2012

(86) PCT No.: PCT/CN2012/072318
§ 371 (c)(1),
(2), (4) Date: Jul. 1, 2014

(87) PCT Pub. No.: WO2013/078796
PCT Pub. Date: Jun. 6, 2013

(65) Prior Publication Data
US 2014/0357318 A1 Dec. 4, 2014

(30) Foreign Application Priority Data

Nov. 28, 2011 (CN) .......................... 2011 1 0384188

(51) Int. Cl.
H04M 1/725 (2006.01)
H04B 1/3816 (2015.01)
(Continued)

(52) U.S. Cl.
CPC ........... *H04B 1/3816* (2013.01); *G06F 21/79* (2013.01); *H04M 1/275* (2013.01);
(Continued)

(58) Field of Classification Search
CPC ..... H04W 12/02; H04W 12/12; H04W 12/18; H04W 24/00; H04M 1/275;
(Continued)

(56) References Cited

U.S. PATENT DOCUMENTS

2008/0207268 A1 8/2008 Tom
2009/0270129 A1* 10/2009 Kuo ........................ G06F 21/77
455/558

(Continued)

FOREIGN PATENT DOCUMENTS

CN 1481638 A 3/2004
CN 1487763 A 4/2004
CN 101400163 A 4/2009

Primary Examiner — Wayne H Cai
(74) Attorney, Agent, or Firm — Ladas & Parry LLP

(57) ABSTRACT

A mobile phone and a communication method thereof are provided. The mobile phone includes a mobile phone body and mobile phone accessory, wherein the mobile phone body includes a first communication module, a mobile phone card information reading module, a data transmission control module and a basic communication module; and the mobile phone accessory include a mobile phone card, a storage module and a second communication module. According to the mobile phone and the communication method thereof, the user data is stored in the mobile phone body and the mobile phone accessory separated from the mobile phone body; the mobile phone body and the mobile phone accessory are interconnected by wireless communication; and when the verification for the identification of the mobile phone body and the mobile phone accessory is failed or the communication therebetween is disconnected, the mobile phone body clears all the user data stored thereby automatically to prevent the user data from being stolen, therefore, the security of the user data is improved.

20 Claims, 5 Drawing Sheets

(51) Int. Cl.
*H04W 24/00* (2009.01)
*H04M 1/275* (2006.01)
*H04W 12/08* (2009.01)
*G06F 21/79* (2013.01)
*H04L 29/06* (2006.01)
*H04W 12/02* (2009.01)
*H04W 12/12* (2009.01)
*H04W 88/02* (2009.01)

(52) U.S. Cl.
CPC ......... *H04M 1/7253* (2013.01); *H04W 12/08* (2013.01); *H04W 24/00* (2013.01); *G06F 2221/2143* (2013.01); *H04L 63/0428* (2013.01); *H04M 1/72577* (2013.01); *H04M 2250/02* (2013.01); *H04W 12/02* (2013.01); *H04W 12/12* (2013.01); *H04W 88/02* (2013.01)

(58) Field of Classification Search
CPC ........... H04M 1/7253; H04M 1/72577; H04M 2250/02; G06F 21/79; G06F 2221/2143; H04B 1/3816; H04L 63/0428
See application file for complete search history.

(56) References Cited

U.S. PATENT DOCUMENTS

2011/0307724 A1* 12/2011 Shaw .................... G06F 21/305
    713/323
2013/0111555 A1* 5/2013 Leneel .................. G06F 21/606
    726/4

\* cited by examiner

MOBILE PHONE AND COMMUNICATION METHOD THEREOF

RELATED APPLICATION INFORMATION

This application is a 371 of International Application PCT/CN2012/072318 filed 14 Mar. 2012 entitled "Mobile Phone And Communication Method Thereof", which was published on 6 Jun. 2013, with International Publication Number WO2013/078796 A1, and which claims priority from CN Application No. 201110384188.0 filed 28 Nov. 2011, the contents of which are incorporated herein by reference.

TECHNICAL FIELD

The disclosure relates to the field of wireless communications, in particular to a mobile phone and a communication method of a mobile phone.

BACKGROUND

With the development of wireless communication technologies and the constant increase of related services, mobile phones have become indispensable tools in the daily life, which results in a stronger demand on the usage security of mobile phones. A Subscriber Identity Module (SIM) card and other storage media are used to identify the identification information and other private information of a user in the mobile phone. Therefore, all the information stored in the mobile phone will be exposed once the mobile phone is lost.

At present, there are mainly two methods for the information security of the mobile phone. One is to encrypt user data, namely, user information is encrypted by using a character string input by a user as a key according to a set encryption algorithm and then stored. The other one is to prevent the mobile phone from stolen, namely, an external device matched with the mobile phone is adopted and wireless communication is maintained between the external device and the mobile phone so that the external device can remind the user when the wireless communication is interrupted as the distance between the mobile phone and the device exceeds a certain distance.

For the first method, limited by the performance of a mobile phone processor, the encryption algorithms which can be supported by the mobile phone are often very simple and most of them are public; moreover, the key is stored in the mobile phone and thus can be decrypted very easily, so the privacy of the user still cannot be protected effectively. For the second method, the mobile phone, which is a common device, is often exposed, so the risk of being stolen is very high; in addition, an anti-theft device for the mobile phone cannot give a precise reminder if the user information is stolen deliberately.

SUMMARY

The disclosure provides a mobile phone and a communication method of a mobile phone, in order to store user data more securely.

The technical scheme of the disclosure is implemented as follows.

A mobile phone includes a mobile phone body and a mobile phone accessory, wherein the mobile phone accessory includes a mobile phone card configured to communicate with an external communication device, a storage module configured to store user data and a second communication module configured to establish wireless communication with the mobile phone body; and the mobile phone body includes:

a first communication module configured to perform data interaction with the second communication module and establish wireless communication between the mobile phone body and the mobile phone accessory;

a mobile phone card information reading module configured to read information of the mobile phone card in the mobile phone accessory;

a basic communication module configured to communicate with an external communication device according to the information of the mobile phone card; and a data transmission control module configured to send an operation instruction to the storage module, to store the user data stored in the storage module to a local memory or update user data in the local memory to the storage module.

Preferably, the mobile phone body and the mobile phone accessory are respectively configured with unique identification information; the mobile phone body and the mobile phone accessory are matched, the identification information corresponding to the mobile phone accessory is stored in the mobile phone body and the identification information corresponding to the mobile phone body is stored in the mobile phone accessory.

Preferably the mobile phone body further includes a security control module, which is configured to periodically detect whether the communication between the mobile phone body and the mobile phone accessory is normal and clear communication data stored in the local memory when the communication is detected to be abnormal.

Preferably the mobile phone body further includes: a verification module, configured to verify whether the identification information in the mobile phone accessory is consistent with the identification information locally stored in the mobile phone body;

the security control module is further configured to clear the user data stored in the local memory if the identification information in the mobile phone accessory is inconsistent with the identification information locally stored in the mobile phone body.

Preferably, the security control module is further configured to give an alarm when the communication is abnormal or the identification information in the mobile phone accessory is inconsistent with the identification information locally stored in the mobile phone body.

Preferably, the mobile phone body further includes:

an encryption module configured to encrypt user data and then locally store the encrypted user data in the mobile phone body or output the encrypted user data to the mobile phone accessory; and a decryption module configured to decrypt user data received from the mobile phone accessory or locally stored in the mobile phone body, Preferably, the encryption module is further configured to set a key input by a user and encrypt the user data according to the key; and the decryption module is further configured to decrypt the user data according to the key.

Preferably, the mobile phone accessory further includes:

a mobile phone body verification module configured to verify user data or operation instruction sent from the mobile phone body and judge whether the mobile phone body is valid according to the verification result; and an alarm module configured to give an alarm on the invalidity of the mobile phone body when the mobile phone body verification module judges that the mobile phone body is invalid.

Preferably, the alarm module is further configured to detect a status of the wireless communication between the mobile phone accessory and the mobile phone body periodically and give an alarm on abnormality of the status of the wireless communication when the status of the wireless communication is detected to be abnormal.

A communication method includes: pre-setting in a mobile phone accessory a mobile phone card configured to communicate with an external communication device, a storage module configured to store user data and a second communication module configured to establish wireless communication with a mobile phone body; and further includes:

performing data interaction between the mobile phone body and the second communication module and establishing wireless communication between the mobile phone body and the mobile phone accessory; and reading information of the mobile phone card in the mobile phone accessory and communicating with an external communication device according to the information of the mobile phone card, wherein an operation instruction is sent to the storage module to store the user data stored in the storage module to a local memory or update user data in the local memory to the storage module.

Preferably, the mobile phone body and the mobile phone accessory are respectively configured with unique identification information; and before the establishment of the wireless communication between the mobile phone body and the mobile phone accessory, the method further includes: matching the mobile phone body and the mobile phone accessory, storing the identification information corresponding to the mobile phone accessory in the mobile phone body and storing the identification information corresponding to the mobile phone body in the mobile phone accessory.

Preferably, the method further includes:
periodically detecting whether the communication between the mobile phone body and the mobile phone accessory is normal and clearing the user data stored in the local memory when the communication is detected to be abnormal.

Preferably, the method further includes:
verifying whether the identification information in the mobile phone accessory is consistent with the identification information locally stored in the mobile phone body; and, clearing the user data stored in the local memory if the identification information in the mobile phone accessory is inconsistent with the identification information locally stored in the mobile phone body.

Preferably, the method further includes: giving an alarm when the communication is abnormal or the identification information in the mobile phone accessory is inconsistent with the identification information locally stored in the mobile phone body.

Preferably, the method further includes:
encrypting user data and then locally storing the encrypted user data in the mobile phone body or outputting the encrypted user data to the mobile phone accessory; and decrypting the user data received from the mobile phone accessory or locally stored in the mobile phone body.

Preferably, the method further includes:
setting a key input by a user and encrypting the user data according to the key; and/or, decrypting the user data according to the key.

Preferably, the method further includes: the mobile phone accessory verifying user data or operation instruction sent from the mobile phone body and judging whether the mobile phone body is valid according to the verification result; and giving an alarm on the invalidity of the mobile phone body when the mobile phone body is judged to be invalid.

Preferably, the method further includes: periodically detecting a status of the wireless communication between the mobile phone accessory and the mobile phone body and giving an alarm on the abnormality of the status of the wireless communication when the status of the wireless communication is detected to be abnormal.

According to the mobile phone and the communication method thereof provided by the disclosure, the user data is stored in the mobile phone body and the mobile phone accessory separated from the mobile phone body; the mobile phone body and the mobile phone accessory are interconnected by wireless communication; and when the verification on the identification of the mobile phone body and the mobile phone accessory is failed or the communication therebetween is disconnected, the mobile phone body clears all the user data stored thereby automatically to prevent the user data from being stolen, therefore, the security of the user data is improved.

DETAILED DESCRIPTION OF THE EMBODIMENTS

The embodiments of the disclosure provide a mobile phone of which the communication device and data storage device are separated from each other. The mobile phone includes a mobile phone body and a mobile phone accessory, wherein a mobile phone card is loaded in the mobile phone accessory. After having purchased a mobile phone, a user matches the mobile phone body with the mobile phone accessory by configuration. The mobile phone body stores user data temporarily and realizes the communication function of the mobile phone; the mobile phone accessory stores data permanently. The mobile phone body and the mobile phone accessory perform data interaction with each other by wireless communication, and the mobile phone body clears the user data stored thereby to ensure the security of the user data when the mobile phone body and the mobile phone accessory are verified to be inconsistent with each other or the wireless communication is interrupted.

Figure 1:
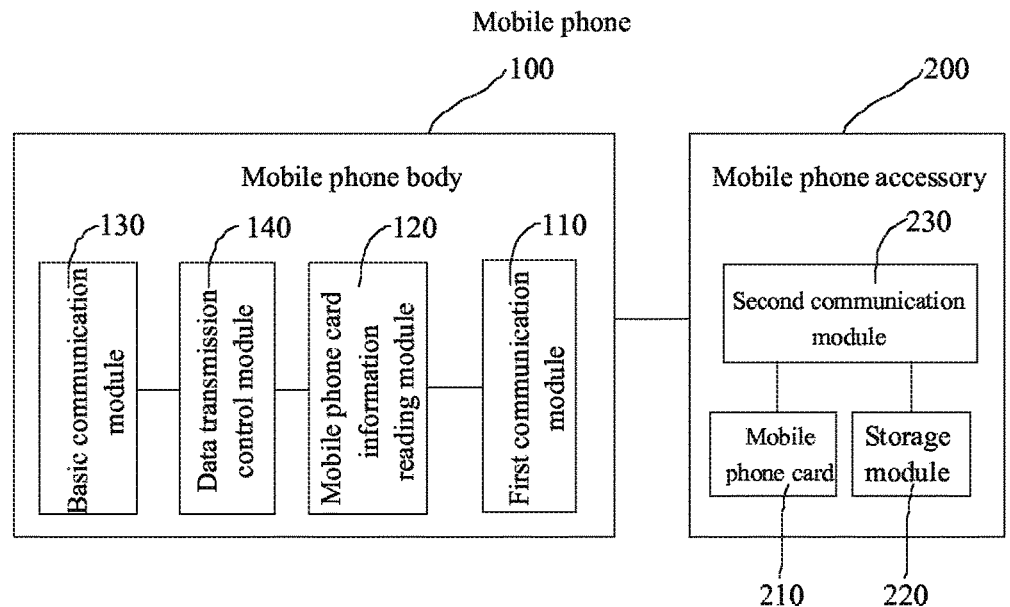
FIG. 1 is a diagram showing the structure of a mobile phone provided by an embodiment of the disclosure.

With reference to FIG. 1, the mobile phone provided by an embodiment of the disclosure includes a mobile phone body 100 and a mobile phone accessory 200.

The mobile phone accessory 200 includes:

a mobile phone card 210 configured to communicate with an external communication device;

a storage module 220 configured to store user data, wherein the storage module 220 may be a memory embedded inside the mobile phone accessory in the embodiment, or may be a Secure Digital (SD) card, a Trans-Flash (TF) card, a high-capacity SD card or other storage cards in other embodiments; and a second communication module 230 configured to establish wireless communication with the mobile phone body 100.

The mobile phone body 100 includes:

a first communication module 110 configured to perform data interaction with the second communication module 230 and establish wireless communication between the mobile phone body and the mobile phone accessory, wherein the wireless communication may be WI-FI wireless connection in the embodiment, and may be Bluetooth wireless connection in other embodiments;

a mobile phone card information reading module 120 configured to read information of the mobile phone card in the mobile phone accessory 200;

a basic communication module 130 including a processor, a battery, a display unit, an input unit, an output interface, a radio frequency unit, a Global Position System (GPS) unit and the like and configured to communicate with an external communication device according to the information of the mobile phone card; and a data transmission control module 140 configured to send an operation instruction to the storage module 220 to store the communication data stored in the storage module 220 to a local memory or update the user data in the local memory of the mobile phone body 100 to the storage module 220.

The mobile phone card 210 configured to communicate with an external communication device, the storage module 220 configured to store user data and the second communication module 230 configured to establish wireless communication with the mobile phone body are pre-set in the mobile phone accessory 200.

The first communication module 110 performs data interaction with the second communication module 230 and establishes wireless communication between the mobile phone body 100 and the mobile phone accessory 200. Specifically, the first communication module 110 sends a wireless communication application to the second communication module 230 when finding an available wireless network and establishes wireless communication with the mobile phone accessory 200 after receiving a response.

The mobile phone card information reading module 120 reads the information of the mobile phone card in the mobile phone accessory 200;

the basic communication module 130 communicates with an external communication device according to the information of the mobile phone card;

the mobile phone body 100 sends an operation instruction to the storage module 220 to store the user data stored in the storage module 220 to the local memory or update the user data in the local memory to the storage module 220. Specifically, the mobile phone body 100 sends an operation instruction to the storage module 220; after the mobile phone accessory 200 verifies that the mobile phone body 100 is valid, the required user data can be read from the storage module 220 if the operation instruction is determined to be a read instruction, and the data formed by the operation of the user can be written into the mobile phone accessory 200 if the operation instruction is determined to be a write instruction.

In the embodiment, in order to implement matching more securely, the mobile phone body and the mobile phone accessory are respectively configured with unique identification information. After being matched successfully, the mobile phone body stores the identification information corresponding to the mobile phone accessory and the mobile phone accessory stores the identification information corresponding to the mobile phone body. The memory, which is configured to store the identification information of the mobile phone body, in the mobile phone accessory is a programmable read-only memory, in which new data cannot be written any more after the identification information of the mobile phone body is written in this memory, so that the mobile phone accessory cannot be matched with other mobile phone bodies any more. Even if a malicious third party obtains the accessory, he/she cannot obtain the user data from the accessory easily, so that the security of the user data in the accessory is ensured. A user can also purchase and match a new mobile phone accessory after the mobile phone accessory is lost. In the embodiment, the mobile phone accessory may be a mobile device in the form of a USB flash disk so that this accessory can be carried conveniently. In other embodiments, the mobile phone accessory may also be a portable mobile device, such as a card, a key chain or a watch.

Figure 2:
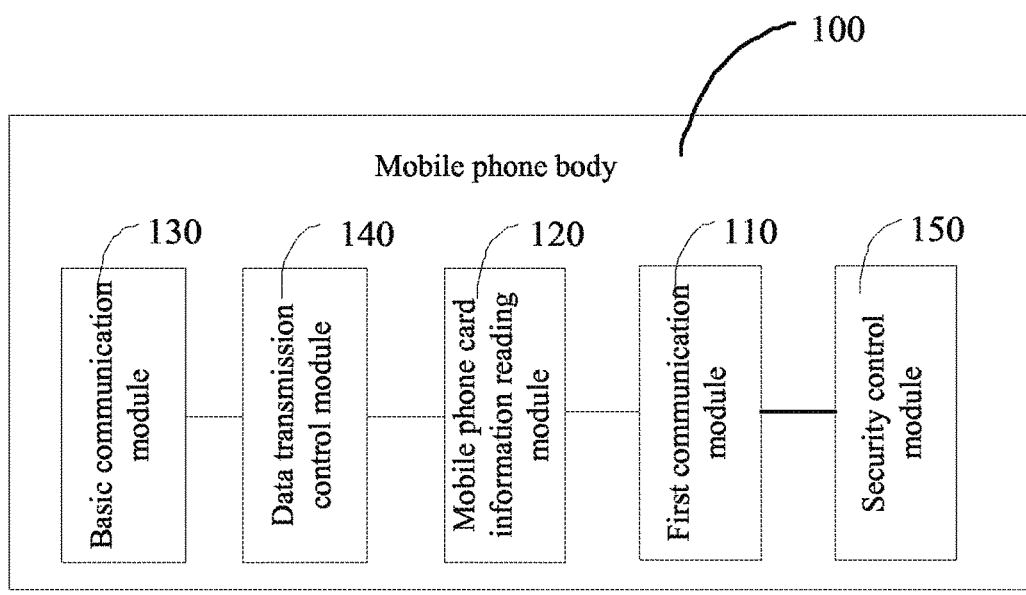
FIG. 2 is a diagram showing the structure of a mobile phone body provided by another embodiment of the disclosure.

With reference to FIG. 2, based on the embodiment above, the mobile phone body 100 in the embodiment may further include a security control module 150 configured to periodically detect whether the communication between the mobile phone body 100 and the mobile phone accessory 200 is normal, and clear the communication data in the local memory when the communication is detected to be abnormal. When the mobile phone body 100 is in a standby status, the security control module 150 periodically detects whether the wireless communication with the mobile phone accessory is normal, if not, for example, the wireless communication is disconnected, the security control module 150 clears the user data in the local memory. When the distance between the mobile phone body and the mobile phone accessory exceeds a certain distance, the wireless communication disconnected automatically and the security control module can delete the user data in the local memory when detecting that the wireless communication is disconnected, therefore, the malicious third party cannot obtain the user data even if he/she obtains the mobile phone body, and in this way, the security of the user data is ensured. In other embodiments, the security control module 150 is further configured to generate an alarm signal and output an alarm prompt if the communication is detected to be abnormal or the identification information of the mobile accessory 200 is inconsistent with that locally stored.

Figure 3:
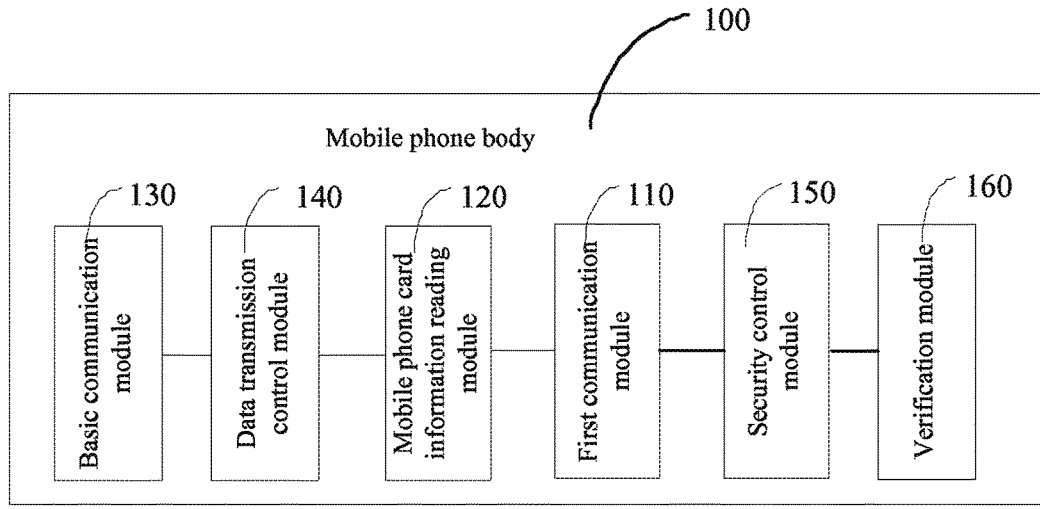
FIG. 3 is a diagram showing the structure of a mobile phone body provided by another embodiment of the disclosure.

With reference to FIG. 3, based on the embodiments above, in the embodiment, the mobile phone body 100 may further include a verification module 160 configured to verify whether the identification information in the mobile phone accessory is consistent with that locally stored in the mobile phone body 100; and the security control module 150 is further configured to clear the user data stored in the local memory when the identification information in the mobile phone accessory 200 is inconsistent with that locally stored in the mobile phone body 100.

Figure 4:
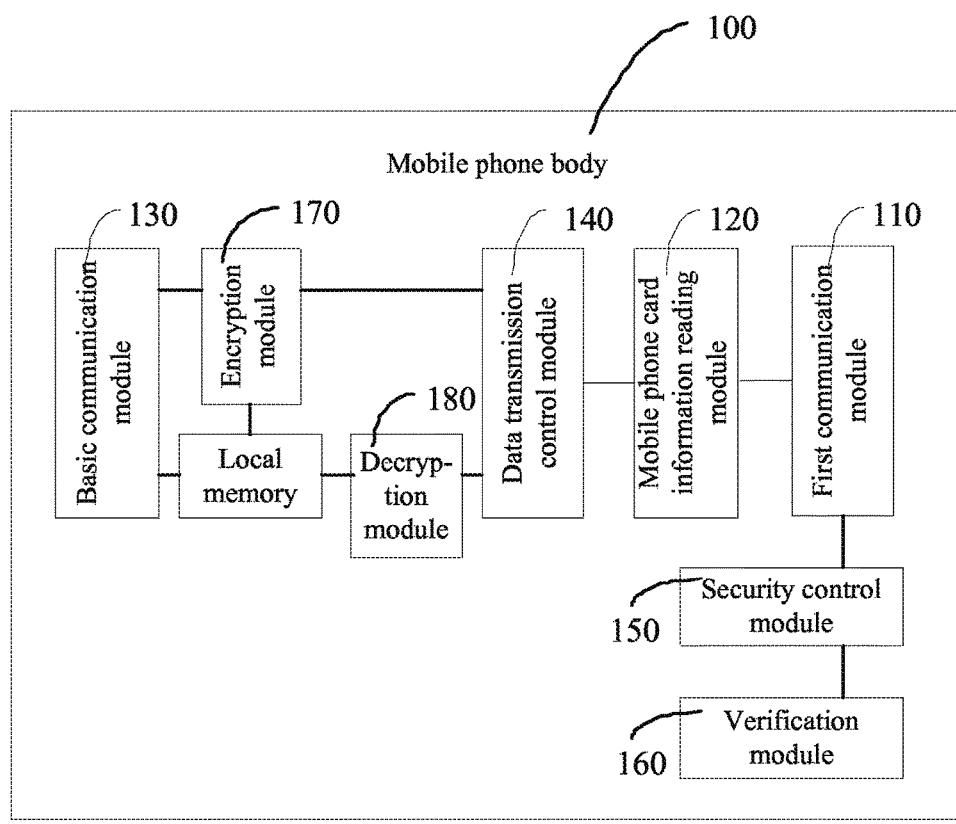
FIG. 4 is a diagram showing the structure of a mobile phone body provided by another embodiment of the disclosure.

With reference to FIG. 4, based on the embodiments above, in the embodiment, the mobile phone body 100 may further include an encryption module 170 and a decryption module 180.

The encryption module 170 is coupled with the local memory, the basic communication module 130 and the data transmission control module 140 and configured to encrypt the user data and then output the encrypted user data to the mobile phone accessory; and the decryption module 180 is coupled with the local memory and the data transmission control module 140 and configured to decrypt the user data received from the mobile phone accessory or locally stored.

Upon the input operation of a user, the encryption module 170 encrypts the data and the operation instruction formed by the operation of the user by a pre-set encryption algorithm, and then stores the encrypted data and instruction to the local memory and sends the encrypted data and instruction to the data transmission control module 140 at the same time; and the encrypted user data is further sent to the mobile phone accessory 200 by the first communication module 110, therefore, all the user data stored in the mobile phone accessory 200 is encrypted. Upon the reading operation of a user, the mobile phone body 100 sends a read instruction to the mobile phone accessory 200 and receives the encrypted user data sent from the mobile phone accessory 200 according to the read instruction; the decryption module 180 decrypts the encrypted user data by a pre-set decryption algorithm and then stores the decrypted user data to the local memory; and the user data is further transmitted to the basic communication module 130 and then displayed and output. In other embodiments, the encryption module 170 is further configured to set a key input by a user and further encrypt the user data by the key and a pre-set encryption algorithm; and the decryption module 180 is further configured to decrypt the user data by the key set by the user and a pre-set decryption algorithm, so as to store the user data more securely. Through the encryption module and the decryption module, the user data stored in the mobile phone accessory is encrypted, so that it can be read only by the decryption module in the mobile phone body; therefore, the data in the mobile phone accessory cannot be obtained easily even if the accessory is stolen maliciously, and in this way, the security of the user data is ensured.

Figure 5:
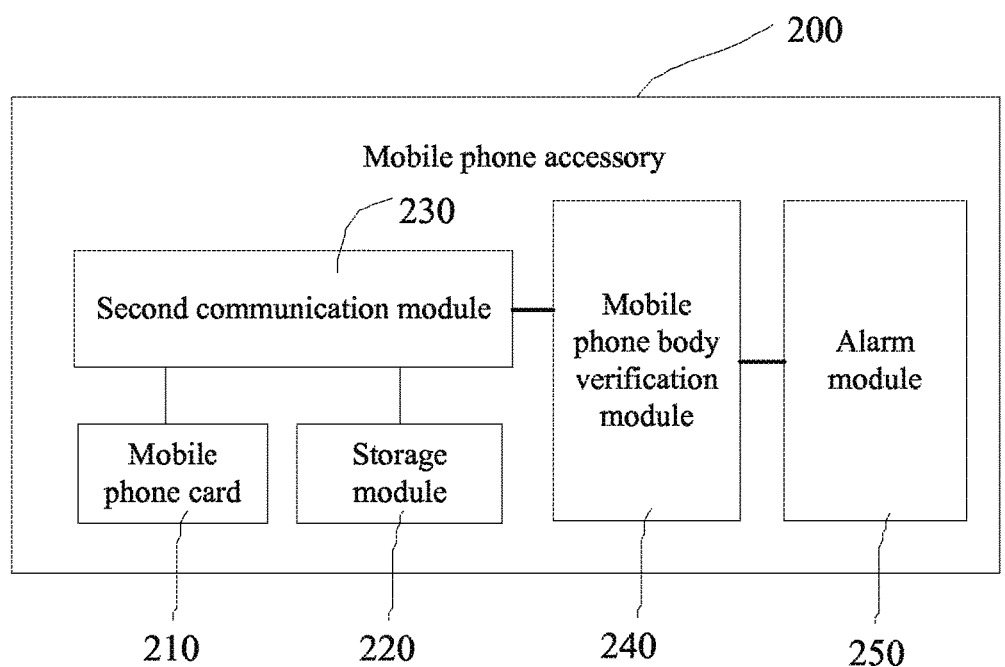
FIG. 5 is a diagram showing the structure of mobile phone accessory provided by another embodiment of the disclosure.

With reference to FIG. 5, the mobile phone accessory 200 further includes a mobile phone body verification module 240 and an alarm module 250.

The mobile phone body verification module 240 is configured to verify the user data or operation instruction sent from the mobile phone body and judge whether the mobile phone body is valid according to the verification result; and the alarm module 250 is configured to generate an alarm signal on the invalidity of the mobile phone body and output an alarm prompt when the mobile phone body is judged to be invalid.

The mobile phone body verification module 240 verifies whether the user data or operation instruction received is from the mobile phone body corresponding to the identification information stored in the mobile phone accessory, if so, the mobile phone body is determined to be valid, otherwise, the mobile phone body is determined to be invalid. When the mobile phone body is invalid, the alarm module 250 generates an alarm signal, on the invalidity of the mobile phone body and outputs an alarm prompt.

Based on the embodiments above, in the embodiment, the alarm module 250 is further configured to periodically detect the status of the wireless communication between the mobile phone accessory and the mobile phone body and generate an alarm signal on the abnormal communication status when the communication status is detected to be abnormal and output the signal. When the mobile phone body or the mobile phone accessory is stolen, the alarm module 25 detects that the wireless communication is disconnected because the distance between the mobile phone accessory and the mobile phone body exceeds a certain value, and then gives an alarm prompt to prevent the mobile phone body from being stolen.

Figure 6:
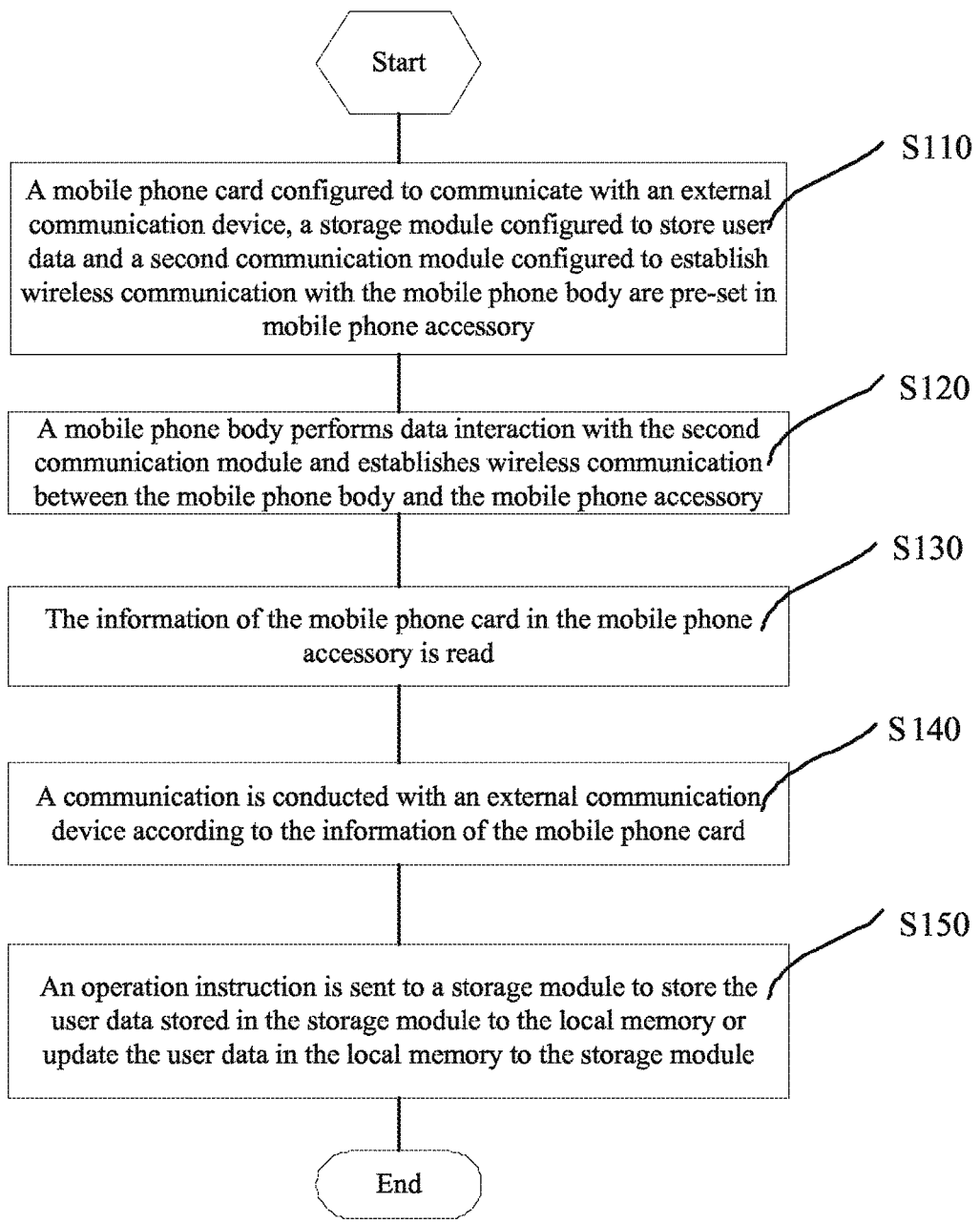
FIG. 6 is a flowchart of a communication method provided by an embodiment of the disclosure.

The embodiment of the disclosure further provides a communication method, as shown in FIG. 6, the method includes the following steps.

Step 110: A mobile phone card configured to communicate with an external communication device, a storage module configured to store user data and a second communication module configured to establish wireless communication with the mobile phone body are pre-set in a mobile phone accessory.

Step 120: A mobile phone body performs data interaction with the second communication module and wireless communication is established between the mobile phone body and the mobile phone accessory.

The mobile phone body sends a wireless communication application to the mobile phone accessory when finding an available wireless network and establishes wireless communication with the mobile phone accessory after receiving a response.

Step 130: The information of the mobile phone card in the mobile phone accessory is read.

Step 140: Communication is conducted with an external communication device according to the information of the mobile phone card.

Step 150: An operation instruction is sent to a storage module to store the user data stored in the storage module to the local memory or update the user data in the local memory to the storage module.

The mobile phone body further sends an operation instruction to the storage module, when the mobile phone accessory verifies that the mobile phone body is valid, the required user data is read from the storage module if the operation instruction is determined to be a read instruction, and the data formed by the operation of the user is written into the mobile phone accessory if the operation instruction is determined to be a write instruction.

Based on the embodiments above, in the embodiment, in order to implement matching more securely, the mobile phone body and the mobile phone accessory are configured with unique identification information respectively, and the method further includes the following step before Step 120: the mobile phone body and the mobile phone accessory are matched, the identification information corresponding to the mobile phone accessory is stored in the mobile phone body and the identification information corresponding to the mobile phone body is stored in the mobile phone accessory. The memory, which is configured to store the identification information of the mobile phone body, in mobile phone accessory is a programmable read-only memory, in which new data cannot be written any more after the identification information of the mobile phone body is written in this memory, so that the mobile phone accessory cannot be matched with other mobile phone bodies any more. Even if a malicious third party obtains the accessory, he/she still cannot obtain user data from the accessory easily, so that the security of the user data in the accessory is ensured. A user can further purchase and match a new mobile phone accessory after the mobile phone accessory is lost. In the embodiment, the mobile phone accessory may be a mobile device in the form of a USB flash disk so that, this accessory can be earned conveniently. In other embodiments, the mobile phone accessory may also be a portable mobile device, such as a card, a key chain or a watch.

Based on the embodiments above, in other embodiments, the method further includes the following steps after the execution of all the above mentioned steps:

detection on whether the communication between the mobile phone body and the mobile phone accessory is normal is executed periodically and the user data in the local memory is cleared when the communication is abnormal. When the mobile phone body is in a standby status, the mobile phone body periodically detects whether the wireless communication with the mobile phone accessory is normal, if not, for example, the wireless communication is disconnected, the mobile phone body clears the user data in the local memory. When the distance between the mobile phone body and the mobile phone accessory exceeds a certain value, the wireless communication will be disconnected automatically and the mobile phone body deletes the user data in the local memory when detecting that the wireless communication is disconnected, therefore, the malicious third party cannot acquire the user data even if he/she obtains the mobile phone body, and in this way, the security of the user data is ensured.

Based on the embodiments above, in the embodiment, the method further includes the following steps after Step 120:

verification on whether the identification information in the mobile phone accessory is consistent with that locally stored in the mobile phone body is executed, if not, the user data in the local memory is cleared; the mobile phone body verifies whether the identification information in the mobile phone accessory is consistent with that locally stored in the mobile phone body, if not, it represents that the mobile phone accessory establishing wireless communication with the mobile phone body now may not be the originally matched mobile phone accessory; in order to prevent the user data from being stolen maliciously, the mobile phone body clears the user data in the local memory if the identification information is not consistent.

Based on the embodiments above, in the embodiment, the method further includes the following steps after the execution of all the above-mentioned steps: an alarm signal is generated and an alarm prompt is output when the communication is detected to be abnormal or the identification information in the mobile phone accessory is inconsistent with that locally stored in the mobile phone body.

Figure 7:
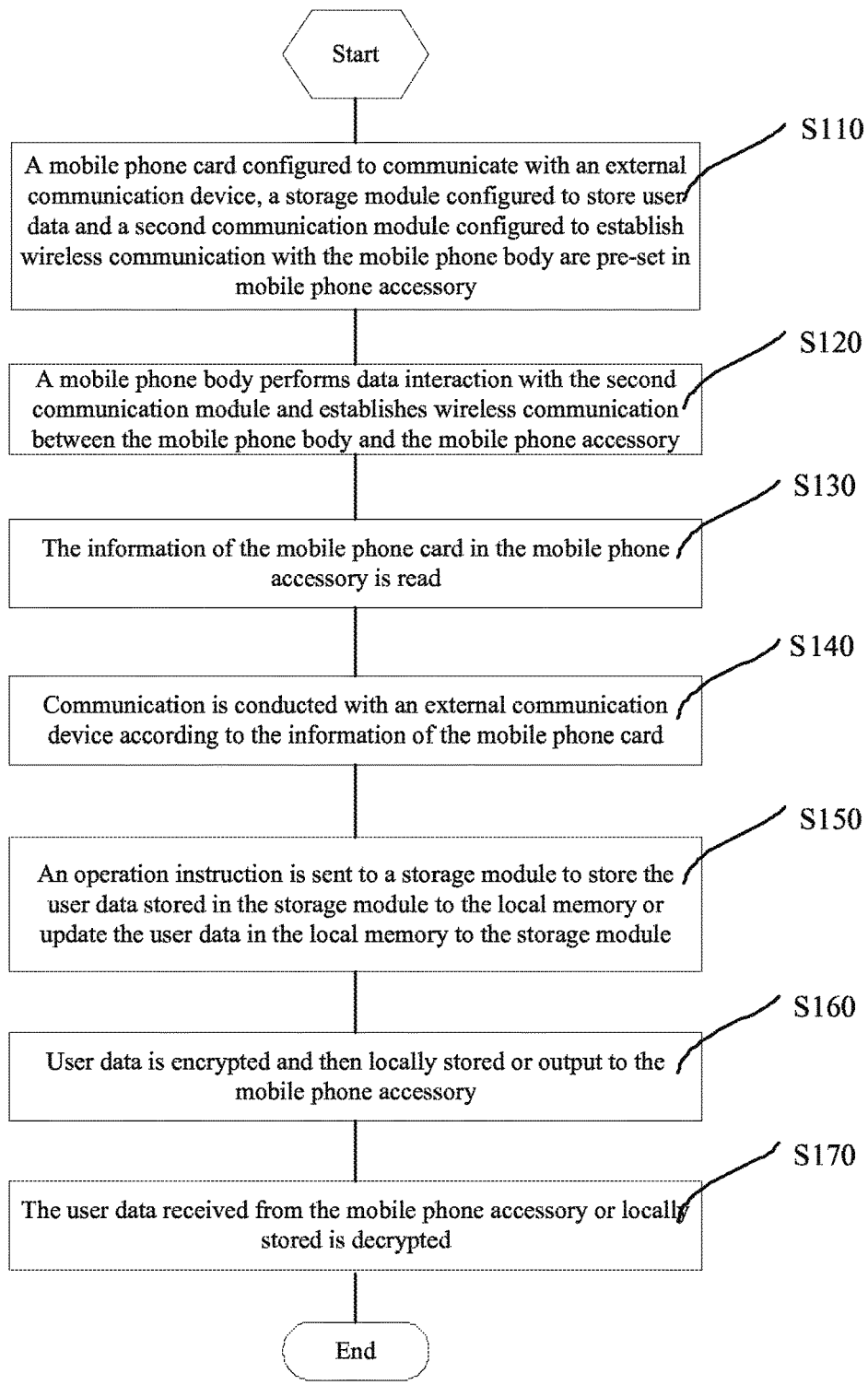
FIG. 7 is a flowchart of a communication method provided by another embodiment of the disclosure.

Based on the embodiments above, in the embodiment, as shown in FIG. 7, the method further includes the following steps after the execution of all the above-mentioned steps.

Step 160: User data is encrypted and then locally stored or output to the mobile phone accessory.

Upon the input operation of a user, the mobile phone body encrypts the data and the operation instruction formed by the operation of the user by a pre-set encryption algorithm and then stores the encrypted data and instruction to the local memory and sends same to the mobile phone accessory at the same time, therefore, all the user data stored in the mobile phone accessory is encrypted.

Step 170: The user data received from the mobile phone accessory or locally stored is decrypted.

Upon the reading operation of a user, the mobile phone body sends a read instruction to the mobile phone accessory and receives the encrypted user data sent from the mobile phone accessory according to the read instruction; the mobile phone body decrypts the encrypted user data by a pre-set decryption algorithm and then stores the decrypted user data to the local memory; and the user data is further displayed and output in the screen of the mobile phone body.

Based on the embodiments above, in the embodiment, Step 160 further includes: the mobile phone body set a key input by a user and further encrypts user data by the key and a pre-set encryption algorithm; and Step 170 further includes: the user data is decrypted by the key set by a user and a pre-set decryption algorithm, so as to store the user data more securely.

Based on the embodiments above, the method further includes the following steps after the execution of all the above-mentioned steps:

the mobile phone accessory verifies the user data or operation instruction from the mobile phone body and judges whether the mobile phone body is valid according to the verification result;

wherein the mobile phone accessory verifies whether the user data or operation instruction received is from the mobile phone body corresponding to the identification information stored in the mobile phone accessory, if so, the mobile phone body is determined to be valid, otherwise, the mobile phone body is determined to be invalid; and when the mobile phone body is invalid, an alarm signal on the invalidity of the mobile phone body is generated and an alarm prompt is output.

Based on the embodiments above, the method further includes the following steps after the execution of all the above-mentioned steps, the mobile phone accessory periodically detects the status of the wireless communication between the mobile phone accessory and the mobile phone body, and generates an alarm signal and outputs the signal when the communication status is abnormal. When the mobile phone body or the mobile phone accessory is stolen, the mobile phone accessory detects that the wireless communication is disconnected because the distance between the mobile phone accessory and the mobile phone body exceeds a certain value, so an alarm prompt is given to prevent the mobile phone body from being stolen.

What described above are only the preferred embodiments of the disclosure and not intended to limit the disclosure, and any modifications, equivalent replacements, improvements and the like made within the principle of the disclosure shall fall within the scope of protection as defined by the appended claims of the disclosure.

What is claimed is:

1. A mobile phone, comprising a mobile phone body and a mobile phone accessory, wherein the mobile phone accessory comprises a mobile phone card configured to communicate with an external communication device, a storage module configured to store user data and a second communication module configured to establish wireless communication with the mobile phone body; and the mobile phone body comprises:

a first communication module configured to perform data interaction with the second communication module and establish wireless communication between the mobile phone body and the mobile phone accessory;

a mobile phone card information reading module configured to read information of the mobile phone card in the mobile phone accessory;

a basic communication module configured to communicate with an external communication device according to the information of the mobile phone card; and a data transmission control module configured to send an operation instruction to the storage module, to store the user data stored in the storage module to a local memory or update user data in the local memory to the storage module.

2. The mobile phone according to claim 1, wherein the mobile phone body and the mobile phone accessory are respectively configured with unique identification information; the mobile phone body and the mobile phone accessory are matched, the identification information corresponding to the mobile phone accessory is stored in the mobile phone body and the identification information corresponding to the mobile phone body is stored in the mobile phone accessory.

3. The mobile phone according to claim 2, wherein the mobile phone accessory further comprises:
 a mobile phone body verification module configured to verify user data or operation instruction sent from the mobile phone body and judge whether the mobile phone body is valid according to the verification result; and
 an alarm module configured to give an alarm on the invalidity of the mobile phone body when the mobile phone body verification module judges that the mobile phone body is invalid.

4. The mobile phone according to claim 3, wherein the alarm module is further configured to detect a status of the wireless communication between the mobile phone accessory and the mobile phone body periodically and give an alarm on abnormality of the status of the wireless communication when the status of the wireless communication is detected to be abnormal.

5. The mobile phone according to claim 1, wherein the mobile phone body further comprises a security control module, which is configured to periodically detect whether the communication between the mobile phone body and the mobile phone accessory is normal and clear communication data stored in the local memory when the communication is detected to be abnormal.

6. The mobile phone according to claim 5, wherein
 the mobile phone body further comprises: a verification module, configured to verify whether the identification information in the mobile phone accessory is consistent with the identification information locally stored in the mobile phone body;
 the security control module is further configured to clear the user data stored in the local memory if the identification information in the mobile phone accessory is inconsistent with the identification information locally stored in the mobile phone body.

7. The mobile phone according to claim 5, wherein the security control module is further configured to give an alarm when the communication is abnormal or the identification information in the mobile phone accessory is inconsistent with the identification information locally stored in the mobile phone body.

8. The mobile phone according to claim 1, wherein the mobile phone body further comprises:
 an encryption module configured to encrypt user data and then locally store the encrypted user data in the mobile phone body or output the encrypted user data to the mobile phone accessory; and
 a decryption module configured to decrypt user data received from the mobile phone accessory or locally stored in the mobile phone body.

9. The mobile phone according to claim 8, wherein the encryption module is further configured to set a key input by a user and encrypt the user data according to the key; and the decryption module is further configured to decrypt the user data according to the key.

10. The mobile phone according to claim 1, wherein the mobile phone accessory further comprises:
 a mobile phone body verification module configured to verify user data or operation instruction sent from the mobile phone body and judge whether the mobile phone body is valid according to the verification result; and
 an alarm module configured to give an alarm on the invalidity of the mobile phone body when the mobile phone body verification module judges that the mobile phone body is invalid.

11. The mobile phone according to claim 10, wherein the alarm module is further configured to detect a status of the wireless communication between the mobile phone accessory and the mobile phone body periodically and give an alarm on abnormality of the status of the wireless communication when the status of the wireless communication is detected to be abnormal.

12. A communication method, comprising: pre-setting in a mobile phone accessory a mobile phone card configured to communicate with an external communication device, a storage module configured to store user data and a second communication module configured to establish wireless communication with a mobile phone body; and further comprising:
 performing data interaction between the mobile phone body and the second communication module and establishing wireless communication between the mobile phone body and the mobile phone accessory; and
 reading information of the mobile phone card in the mobile phone accessory and communicating with an external communication device according to the information of the mobile phone card, wherein an operation instruction is sent to the storage module to store the user data storied in the storage module to a local memory or update user data in the local memory to the storage module.

13. The communication method according to claim 12, wherein the mobile phone body and the mobile phone accessory are respectively configured with unique identification information; and before the establishment of the wireless communication between the mobile phone body and the mobile phone accessory, the method further comprises: matching the mobile phone body and the mobile phone accessory, storing the identification information corresponding to the mobile phone accessory in the mobile phone body and storing the identification information corresponding to the mobile phone body in the mobile phone accessory.

14. The communication method according to claim 12, further comprising:
 periodically detecting whether the communication between the mobile phone body and the mobile phone accessory is normal and clearing the user data stored in the local memory when the communication is detected to be abnormal.

15. The communication method according to claim 14, further comprising:
 verifying whether the identification information in the mobile phone accessory is consistent with the identification information locally stored in the mobile phone body; and,
 clearing the user data stored in the local memory if the identification information in the mobile phone accessory is inconsistent with the identification information locally stored in the mobile phone body.

16. The communication method according to claim 14, further comprising: giving an alarm when the communication is abnormal or the identification information in the mobile phone accessory is inconsistent with the identification information locally stored in the mobile phone body.

17. The communication method according to claim 12, further comprising:
   encrypting user data and then locally storing the encrypted user data in the mobile phone body or outputting the encrypted user data to the mobile phone accessory; and
   decrypting the user data received from the mobile phone accessory or locally stored in the mobile phone body.

18. The communication method according to claim 17, further comprising:
   setting a key input by a user and encrypting the user data according to the key; and/or,
   decrypting the user data according to the key.

19. The communication method according to claim 12, further comprising: the mobile phone accessory verifying user data or operation instruction sent from the mobile phone body and judging whether the mobile phone body is valid according to the verification result; and giving an alarm on the invalidity of the mobile phone body when the mobile phone body is judged to be invalid.

20. The communication method according to claim 19, further comprising: periodically detecting a status of the wireless communication between the mobile phone accessory and the mobile phone and giving an alarm on the abnormality of the status of the wireless communication when the status of the wireless communication is detected to be abnormal.

* * * * *